Dec. 22, 1925.
M. TOCCHIO
1,566,449
ELECTRIC COOKING GRILL
Filed Sept. 17, 1923
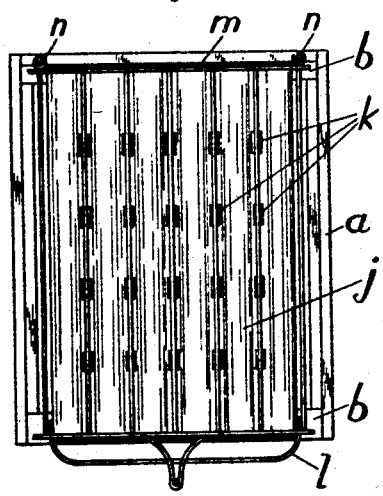
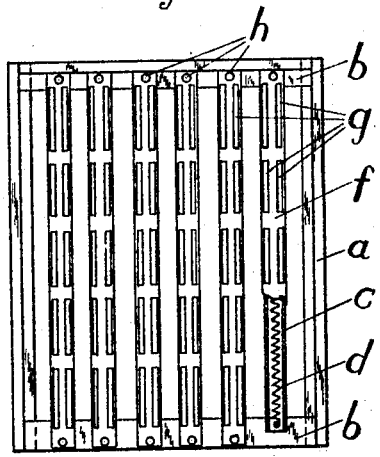
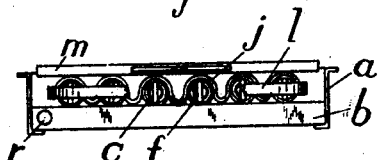
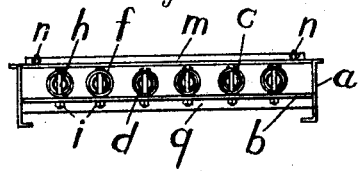
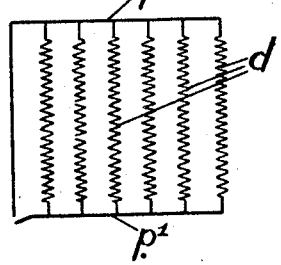
WITNESSES.
INVENTOR.

Patented Dec. 22, 1925.

1,566,449

UNITED STATES PATENT OFFICE.

MICHELE TOCCHIO, OF HAMMERSMITH, LONDON, ENGLAND.

ELECTRIC COOKING GRILL.

Application filed September 17, 1923. Serial No. 663,152.

*To all whom it may concern:*

Be it known that I, MICHELE TOCCHIO, a subject of the King of Italy, residing at 126 Dalling Road, Hammersmith, in the county of London, in England, have invented new and useful Improvements in or Relating to an Electric Cooking Grill, of which the following is a specification.

This invention relates to improvements in or relating to electric cooking grills, and has for its object to provide a simple and efficient means for cooking a steak and the like on both sides simultaneously when placed in an electric oven, thereby greatly reducing the time that has hitherto been required and eliminating a loss of the essence of the meat.

In one form of my invention I provide a rectangular, square or other shaped frame for supporting a number of asbestos, fireclay, silica and the like tubes of an equal length, and each having a thin helical shaped wire therein which is heated by electricity in the usual manner. Said tubes are enclosed in a metal casing with apertures to permit the heat to egress through by convection and are secured to the respective ends of the frame in a parallel position and at equal distances apart by means of screws, bolts, solder and the like.

Over the above described tubes I fit a removable cover with a corrugated surface having slots provided to allow the fat to flow through into a tray. Said cover is provided at one end with a handle, whereby the same may be easily detached from the tubes for cleaning purposes.

A grid is hinged at one end of the frame for supporting a steak in position, and when lowered engages with a catch or fastener mounted on the opposite end of the frame.

In the accompanying drawings I shew one form of my invention in which Fig. 1, is a top view of the grill; Fig. 2, is a like view with the grid and cover removed; Fig. 3 is a front view of Fig. 1; Fig. 4, is a back view, and, Fig. 5, is a diagram of the circuit.

In the form shewn my invention comprises a metallic frame $a$, with a transverse shelf or bracket $b$, riveted, soldered or welded to the side members of the frame $a$.

A number of asbestos, fire-clay, silica and the like tubes $c$, are provided with a thin helical shaped wire $d$ therein, which passes out near the respective ends through an orifice, for connecting to the electric supply. Said tubes $c$, are enclosed in a metal casing $f$, with apertures $g$, which in turn are each secured to the transverse shelves $b$, by means of bolts $h$, and nuts $i$, as shewn in Fig. 4, or may be secured in any suitable manner.

A removable cover $j$, is mounted over the above described metal casing $f$, with a corrugated surface wherein slots $k$, are provided in the concave portion, which latter is interposed between the said casing $f$, for the purpose of allowing the fat to flow through into a tray or receiver, said cover $j$, has a handle $l$, at one end as shewn in Figs. 1, and 3, whereby the same can easily be removed when desired.

On to the transverse end frame member I fit a grid $m$, by means of hinges $n$, which is closed by a fastener, mounted on to the front tranverse frame member.

In Fig. 5, I shew the arrangement of the circuit wherein the helical wires $d$, are in parallel, and the leading in wires $p$, and $p^i$, are enclosed in a casing $q$, on the underside of the frame $a$, and are connected to the mains by a plug $r$, as shewn in Fig. 3.

In another form of my invention I provide a number of rods composed of china, porcelain, silica and the like formed with a spiral groove which in turn receives a thin helical shaped wire heated by electricity.

Over each of the above described rods I mount a tubular casing of a like material, to the aforesaid rods, with apertures to permit the heat to egress as hereinbefore described.

The aforesaid casings are inserted into metallic tubes, and are rigidly held very closely together but not touching in a parallel position by means of metallic bars or a frame constructed as shewn in the accompanying drawings, secured transversely to the said tubes at their respective ends by rivets or screws, and the steak is placed thereon, and the fat will percolate between the said tubes into a tray.

A handle is provided at one end of the tubes and a grid is hinged to the transverse bar or frame as herein set forth.

If preferable I may in place of metallic tubes use a sheet metal casing of a corrugated shape to form a number of apertures for receiving the above described silica and like casings and the helical wire need not be wound in a spiral formation. Interposed between these said corrugations are apertures to allow the fat to flow through into a tray.

From the foregoing description it will be readily understood that when my improved grill is inserted into an electric oven or the like, the heat from the latter will cook the steak on one side and simultaneously the heat from my device will cook the underside, thereby greatly reducing the time that has hitherto been required and the loss of essence from the meat.

My invention may be used for making toast, pastries and many other analogous uses.

I claim:

1. An electric cooking grill having a frame with a transverse bracket mounted at each end, a number of silica tubes with a helical shaped conducting wire therein, each said tube enclosed and supported by a perforated metallic casing secured at each end in a parallel position.

2. An electric cooking grill having a frame with a transverse bracket mounted at each end, a number of silica tubes with a helical shaped conducting wire therein passing in and out through an orifice near the respective ends, each said tube enclosed and supported in a parallel position by a perforated casing secured to the frame.

3. An electric cooking grill having a frame with a transverse bracket at each end, a number of silica tubes with a conducting wire therein passing in and out through an orifice near the respective ends at the base, each said tube enclosed in a perforated casing secured to the brackets by a nut and bolt.

4. An electric cooking grill having a frame with a transverse bracket at each end, a number of silica tubes with a conducting wire therein passing in and out through an orifice near the respective ends at the base, each said tube enclosed in a perforated casing secured to the brackets by a nut and bolt, and a removable cover mounted thereover.

5. An electric cooking grill having a frame with a transverse bracket at each end, a number of silica tubes with a conducting wire therein passing in and out through an orifice near the respective ends at the base, each said tube enclosed in a perforated casing secured to the brackets by a nut and bolt, a removable cover with a corrugated surface, and slots in the concave portion.

6. An electric cooking grill having a frame with a transverse bracket at each end, a number of tubes of a non-conducting material, with a conducting wire therein passing in and out near the respective ends, said tubes enclosed in a perforated casing secured at each end by a nut and bolt, a removable corrugated cover with a handle at one end.

7. An electric cooking grill having a frame with transverse brackets at each end, a number of silica tubes with a conducting wire therein, said tubes enclosed in a perforated casing secured at each end by a nut and bolt, a removable corrugated cover with a handle and a grid hinged to the rear bracket.

8. An electric cooking grill having a frame with transverse brackets, a number of silica tubes with a helical shaped conducting wire therein enclosed in a perforated casing secured at each end to the frame by a nut and bolt, a removable corrugated cover with a handle, a wire grid hinged to the rear bracket, and enclosed by a fastener at the front.

9. An electric cooking grill having a frame with transverse brackets, a number of silica tubes with a helical shaped conducting wire therein enclosed in a perforate casing secured at each end to the frame by a nut and bolt, a removable corrugated cover with a handle, a wire grid hinged at the upper end of the rear bracket, and closed by a fastener at the front, and the leading wires mounted in a conduit on the underside of the frame, and is provided with a plug.

MICHELE TOCCHIO.